US012023529B1

(12) United States Patent
Allen et al.

(10) Patent No.: US 12,023,529 B1
(45) Date of Patent: Jul. 2, 2024

(54) VIRTUAL OPERATOR FOR RESPIRATOR FIT TESTING

(71) Applicant: OHD, LLLP, Hoover, AL (US)

(72) Inventors: Luther Allen, Birmingham, AL (US); Stephanie Lynch, Birmingham, AL (US); Booth Armstrong, Birmingham, AL (US)

(73) Assignee: OHD, LLLP, Hoover, AL (US)

( * ) Notice: Subject to any disclaimer, the term of this patent is extended or adjusted under 35 U.S.C. 154(b) by 0 days.

(21) Appl. No.: 18/201,460

(22) Filed: May 24, 2023

(51) Int. Cl.
*A62B 27/00* (2006.01)

(52) U.S. Cl.
CPC .................................... *A62B 27/00* (2013.01)

(58) Field of Classification Search
CPC ......... A62B 27/00; A62B 9/006; A62B 18/02; A62B 18/025
See application file for complete search history.

(56) References Cited

U.S. PATENT DOCUMENTS 9,761,047 B2 9/2017 Bai et al.
9,928,450 B2 3/2018 Geva et al.
10,459,232 B2 10/2019 Grashow
11,040,227 B2 6/2021 Gugino
11,305,138 B2 4/2022 Bjorkquist et al.
11,358,014 B2 8/2022 Bonnin et al.
11,409,137 B2 8/2022 Bonnin et al.
11,417,072 B2 8/2022 Cunliffe et al.
2007/0295331 A1* 12/2007 Crutchfield ............ A62B 27/00 73/40
2018/0008849 A1* 1/2018 Baker ................. G01M 3/3218
2018/0311517 A1* 11/2018 Patil ....................... A62B 18/02
2020/0230444 A1 7/2020 Viner et al.
(Continued)

FOREIGN PATENT DOCUMENTS

WO 2021107874 A1 6/2021
WO 2021229372 A1 11/2021
(Continued)

OTHER PUBLICATIONS

OSHA Appendix A to § 1910.134—Fit Testing Procedures (Mandatory) (retrieved from https://web.archive.org/web/20220423215248/https://www.osha.gov/laws-regs/regulations/standardnumber/1910/1910.134AppA with date Apr. 23, 2022.*
(Continued)

*Primary Examiner* — Joseph D. Boecker
(74) *Attorney, Agent, or Firm* — Dentons Cohen & Grigsby P.C.

(57) ABSTRACT

A system, method, and computer program product for performing a respirator fit test. An example aspect is configured to: instruct a user to select a respirator; instruct the user to connect at least one set of tubing to the respirator and a fit testing device; instruct the user to don the respirator; prompt the user to begin the respirator fit test; perform the respirator fit test upon receiving a positive response from the user; detect at a processor, a signal from the respirator fit testing device; analyze data of the respirator fit test on the processor; troubleshoot at least one failure of the respirator fit test when a failing fit factor is detected; display to the user a subset of videos on a graphical user interface to correct the failure; and, perform the respirator fit test at least a second time.

26 Claims, 3 Drawing Sheets

(56) References Cited

U.S. PATENT DOCUMENTS

| | | | |
|---|---|---|---|
| 2021/0106854 A1 | 4/2021 | Shen et al. | |
| 2021/0142465 A1 | 5/2021 | Donoghue et al. | |
| 2021/0299384 A1 | 9/2021 | Fu et al. | |
| 2021/0316175 A1* | 10/2021 | Bjorkquist | G01N 1/2273 |
| 2021/0361897 A1 | 11/2021 | Neal et al. | |
| 2022/0134137 A1 | 5/2022 | Webb et al. | |
| 2022/0134147 A1* | 5/2022 | Webb | G01N 15/0656 702/23 |
| 2023/0001123 A1 | 1/2023 | Tan et al. | |

FOREIGN PATENT DOCUMENTS

| | | | |
|---|---|---|---|
| WO | 2022183116 A1 | 9/2022 | |
| WO | WO-2024003841 A1 * | 1/2024 | G01M 11/08 |

OTHER PUBLICATIONS

"PortaCount Respirator Fit Tester"; retrieved from https://web.archive.org/web/20220422053220/https://tsi.com/modifiedcncprotocol/, dated Apr. 22, 2022.*

"Demo—PortaCount Respirator Fit Tester running OSHA's Modified CNC Protocols"; https://vimeo.com/387031403, dated Jan. 24, 2020.*

Quantifit—Performing the Fit Test; https://www.youtube.com/watch?v=6Z9WoiCyEmw, dated Sep. 26, 2013; single screenshot attached.*

"OHD's QuantiFit2(R) Training Video"; https://www.youtube.com/watch?v=ThLIVw_jse4, dated Aug. 14, 2021; select screenshots attached.*

"OHD Quantifit—Mask Fit Test"; https://www.youtube.com/watch?v=9Z223-6CvZA, dated May 17, 2018.*

"QuantiFit2 Manual"; retrieved from https://ohdusa.com/wp-content/uploads/2021/10/QuantiFit2-Manual.pdf; dated 2021.*

Alexander Curtiss et al., FaceBit: Smart Face Masks Platform, Proc. ACM Interact. Mob. Wearable Ubiquitous Technol. 5, 4, Article 151 (Dec. 2021), 44 pages.

Michael S. Bergman et al., Development of an Advanced Respirator Fit-Test Headform, Journal of Occupational and Environmental Hygiene, 2014, 117-125, v 11.

"PortaCount Respirator Fit Tester OSHA Protocols", Scribber.com, TSI Incorporated, https://tsi.com/focus/portacount-respirator-fit-tester-osha-protocols/.

* cited by examiner

VIRTUAL OPERATOR FOR RESPIRATOR FIT TESTING

FIELD OF THE INVENTION

This disclosure generally relates to the field of fit testing for respirators, and more particularly, systems and methods of performing a fit test utilizing a virtual operator.

BACKGROUND

The use of respirators is required by several national and international standards, including the Occupational Safety and Health Administration (OSHA) in the United States when hazardous substances in the air cannot be controlled to an acceptable level for the health of employees. As a result, millions of individuals who may encounter inhalation hazards on the job rely on respirators.

According to OSHA, to ensure a respirator provides an appropriate level of protection, it is necessary that employers develop and maintain a respiratory protection program, of which respirator fit testing is a core concept. A respirator fit test evaluates the fit of a respirator to a wearer. A respirator fit test may ensure a respirator wearer is using an appropriate model, style, and size respirator. Fit testing may be performed qualitatively using a test agent detectable by the wearer, such as via the wearer's sense of taste, smell, or reaction to an irritant. Fit testing may also be performed quantitatively using an instrument to measure leakage of a test agent.

Properly and tight-fitting respirators are necessary to avoid health concerns caused by the inhalation of contaminants due to poor seals, fittings, and other complications. Conventional respirator fit testing may be performed by a person who is qualified in the testing methods. Human fit testing proctors are unable to detect and troubleshoot certain method specific fit test exercise failures that are not evident to the human senses. Accordingly, there is a need for systems and methods to efficiently detect and troubleshoot failures in respirator fitting processes without a need for a human proctor, especially failures undetectable and not addressable by a human proctor.

BRIEF SUMMARY

The systems and methods of the present disclosure address one or more of the shortcomings of conventional respirator fit testing and the troubleshooting of fit testing failures without the need for a human operator. The systems and methods of the present disclosure generally utilize a virtual operator for respirator fit testing.

The virtual operator may detect and troubleshoot failures that are not detectable or addressable by a human proctor.

The systems and methods of the present disclosure may detect at least one failure of a respirator fit test and troubleshoot the at least one failure by displaying a subset of videos, wherein a user may receive instructions that describe user actions and/or adjustments to the fitting of the respirator that may correct the failure when the respirator fit test is performed for at least a second time.

The presently disclosed systems and methods may be embodied as a system, method, or computer program product embodied in any tangible medium of expression having computer useable program code embodied in the medium.

DESCRIPTION OF THE DRAWINGS

It is to be understood that both the foregoing summary and the following drawings and detailed description may be exemplary and may not be restrictive of the aspects of the present disclosure as claimed. Certain details may be set forth to provide a better understanding of various features, aspects, and advantages of the invention. However, one skilled in the art will understand that these features, aspects, and advantages may be practiced without these details. In other instances, well-known structures, methods, and/or processes associated with methods of practicing the various features, aspects, and advantages may not be shown or described in detail to avoid unnecessarily obscuring descriptions of other details of the invention.

The present disclosure may be better understood by reference to the accompanying drawing sheets, in which.

DETAILED DESCRIPTION

Figure 1:
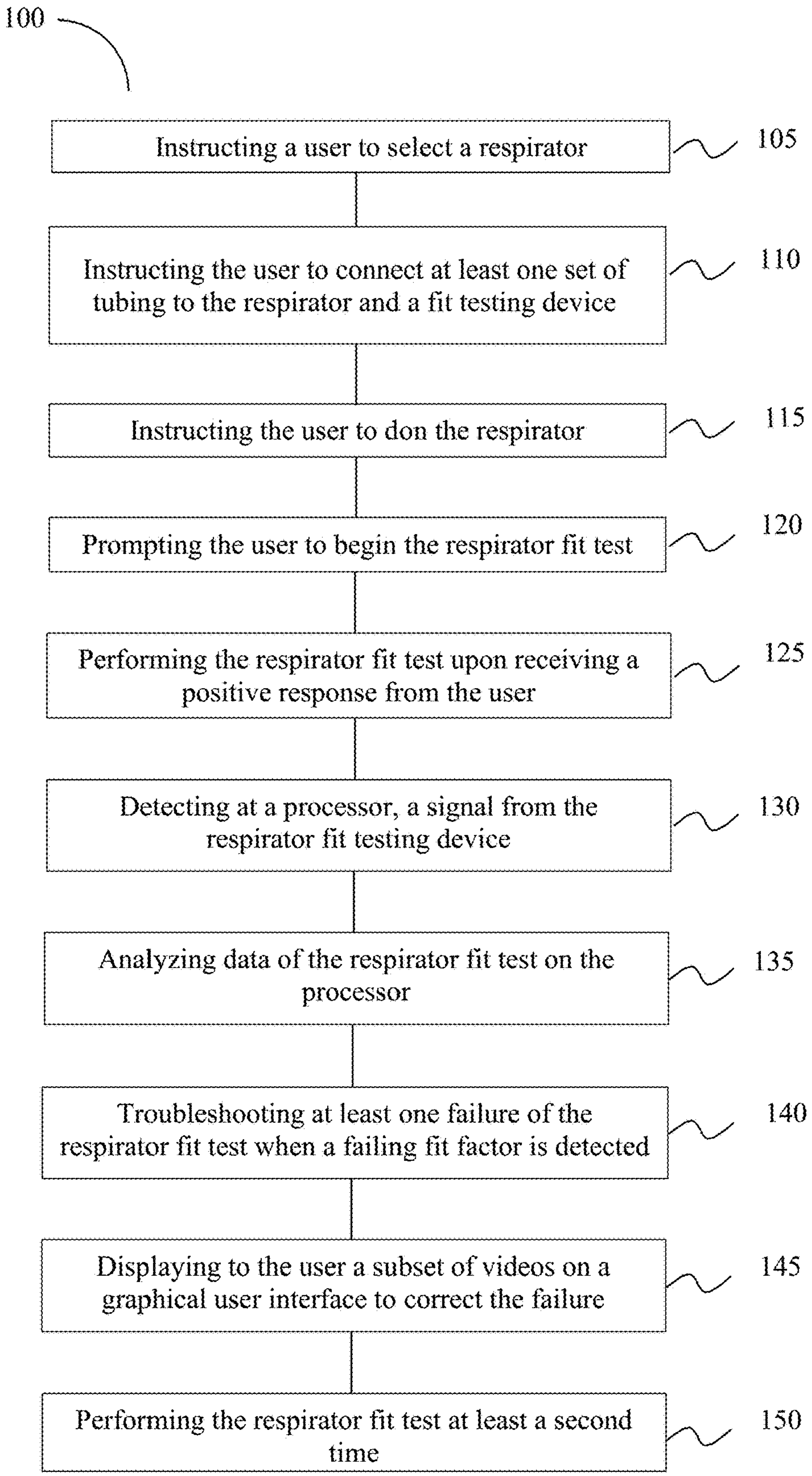
FIG. 1 includes a flow chart of a method for performing a respirator fit test, in accordance with certain aspects of the presently disclosed invention described herein.

This disclosure generally describes systems and methods for performing a respirator fit test. The respirator fit test may comprise quantitative fit testing methods, including but not limited to, Controlled Negative Pressure (CNP), Condensation Nuclei Counting (CNC), and any similar method thereof.

It is understood, however, that this disclosure also embraces numerous alternative features, aspects, and advantages that may be accomplished by combining any of the various features, aspects, and/or advantages described herein in any combination or sub-combination that one of ordinary skill in the art may find useful. Such combinations or sub-combinations are intended to be included within the scope of this disclosure. As such, the claims may be amended to recite any features, aspects, and advantages expressly or inherently described in, or otherwise expressly or inherently supported by this disclosure. Further, any features, aspects, and advantages that may be present in the prior art may be affirmatively disclaimed. Accordingly, this disclosure may comprise, consist of, consist essentially of, or be characterized by one or more of the features, aspects, and advantages described herein.

Definitions

Unless otherwise defined, all terms (including technical and scientific terms) used herein have the same meaning as commonly understood by one of ordinary skill in the art to which this disclosure belongs. As such, terms, such as those defined by commonly used dictionaries, should be interpreted as having a meaning that is consistent with their meaning in a context of a relevant art and should not be interpreted in an idealized or overly formal sense unless expressly so defined herein.

As used herein, the term “fit factor” refers to a calculation based on a measurement of leakage of a respirator made by an instrument during a series of exercises as part of an approved respirator fit test protocol. A “fit factor” may also refer to a quantitative estimate of the fit of a particular respirator to a specific individual. For CNP a “fit factor” creates a ratio of what would be the total air entering the respirator to that of the possibly contaminated air entering the respirator. CNP may calculate a “fit factor” by taking a modeled breathing rate associated with pressure created within the respirator and dividing it by the measured leak rate. For CNC, a “fit factor” estimates the ratio of the concentration of particles in ambient air to its concentration inside the respirator when worn. CNC may calculate a “fit factor” by sampling the ambient aerosol concentration outside the respirator and the concentration inside the respirator, wherein the calculated fit factor is the concentration of the particles outside the mask divided by the particle concentration inside the mask. Both CNP and CNC may average the exercise fit factors using a harmonic mean to calculate an overall fit factor. A higher value fit factor may indicate a better fit and may be more appropriate for more vigorous work conditions.

As used herein, the term “Controlled Negative Pressure” or “CNP” refers to a quantitative fit testing method utilizing negative pressure as a direct measure of respirator leakage using air as the test challenge agent. CNP is based on exhausting air from a temporarily sealed respirator facepiece to generate and then maintain a constant negative pressure inside the facepiece, wherein the rate of air exhaust is controlled such that a constant negative pressure is maintained in the respirator during the fit test. With constant pressure, air flow out of the respirator is equal to air flow into the respirator. Thus, measurement of the exhaust stream that holds the pressure in the temporarily sealed respirator constant yields a direct measure of leakage air flow into the respirator. CNP may then measure leak rates through the respirator to determine a fit factor.

As used herein, the term “Condensation Nuclei Counting” or “condensation nuclei counter” or “CNC” or “ambient aerosol” or “ambient aerosol condensation nuclei counter” refers to a quantitative fit testing method utilizing laser technology to measure aerosol leakage into a respirator with aerosols in the ambient air as the test challenge agent. CNC may comprise a probe on the respirator capable of sampling the air from inside the mask. Test challenging agents include but are not limited to, ambient air or sodium chloride.

As used herein, the term “breathe” may include normal breathing, deep breathing, shallow breathing, or any combination thereof.

As used herein, the term “adapter” may be used to refer to any device capable of attaching and/or connecting a respirator to a fit testing device.

As used herein, the term “probe” may be used to refer to any device capable of maintaining an opening into a respirator wherein tubing connected to the fit testing device may be connected onto or inserted into the probed opening.

As used herein, the term “Fast-Full” or “FF” refers to a quantitative fit testing protocol for full-facepiece elastomeric respirators.

As used herein, the term “Fast-Half” or “FH” refers to a quantitative fit testing protocol for half-mask elastomeric respirators.

As used herein, the term “Fast-FFR” refers to a quantitative fit testing protocol for filtering facepiece respirators.

As used herein, the term “respirator” refers to, but is not limited to, a tight-fitting respirator, an air-purifying respirator, a supplied-air respirator, an elastomeric half facepiece respirator, an elastomeric full facepiece respirator, a filtering facepiece respirator, a powered air-purifying respirator, a supplied-air respirator, a self-contained breathing apparatus, or a combination respirator.

U.S. Pat. No. 8,528,559 entitled “RESPIRATOR FIT-TESTING APPARATUS AND METHOD” and U.S. Pat. No. 8,011,368 entitled “RESPIRATOR FIT-TESTING APPARATUS AND METHOD” are hereby incorporated by reference in their entirety.

As used herein, the term “and/or” includes any and all combinations of one or more of the associated listed items. Likewise, as used in the following detailed description, the term “or” is intended to mean an inclusive “or” rather than an exclusive “or.” That is, unless specified otherwise, or clear from context, “X employs A or B” is intended to mean nay of the natural inclusive permutations. Thus, if X employs A; X employs B; or X employs both A and B, then “X employs A or B” is satisfied under any of the foregoing instances.

The terminology used herein is for the purpose of describing particular examples only and is not intended to be limiting. As used herein, the singular forms “a”, “an”, and “the” may be intended to include the plural forms as well, unless the context clearly dictates otherwise. As example, “an” adapter may comprise one or more adapters, and the like.

The terms “comprises”, “comprising”, “including”, “having”, and “characterized by”, may be inclusive and therefore specify the presence of stated features, elements, compositions, steps, integers, operations, and/or components, but do not preclude the presence or addition of one or more other features, integers, steps, operations, elements, components, and/or groups thereof. Although these open-ended terms may be to be understood as a non-restrictive term used to describe and claim various aspects set forth herein, in certain aspects, the term may alternatively be understood to instead be a more limiting and restrictive term, such as “consisting of” or “consisting essentially of” Thus, for any given aspect reciting compositions, materials, components, elements, features, integers, operations, and/or process steps, described herein also specifically includes aspects consisting of, or consisting essentially of, such recited compositions, materials, components, elements, features, integers, operations, and/or process steps. In the case of “consisting of”, the alternative aspect excludes any additional compositions, materials, components, elements, features, integers, operations, and/or process steps, while in the case of “consisting essentially of”, any additional compositions, materials, components, elements, features, integers, operations, and/or process steps that materially affect the basic and novel characteristics may be excluded from such an aspect, but any compositions, materials, components, elements, features, integers, operations, and/or process steps that do not materially affect the basic and novel characteristics may be included in the aspect.

Any method steps, processes, and operations described herein may not be construed as necessarily requiring their performance in the particular order discussed or illustrated, unless specifically identified as an order of performance. It is also understood that additional or alternative steps may be employed, unless otherwise indicated.

In addition, features described with respect to certain example aspects may be combined in or with various other example aspects in any permutational or combinatory manner. Different aspects or elements of example aspects, as disclosed herein, may be combined in a similar manner. The term "combination," "combinatory," or "combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included may be combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Aspects of the present disclosure may be described herein with reference to flowchart illustrations and/or block diagrams of methods, apparatus (systems), and computer program products according to aspects of the disclosure. It will be understood that each block of the flowchart illustrations and/or block diagrams, and combinations of blocks in the flowchart illustrations and/or block diagrams, may be implemented by computer readable program instructions. The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

Words such as "then," "next," etc. are not intended to limit the order of the steps; these words may be simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

In the description, certain details are set forth to provide a better understanding of various aspects of the systems and methods disclosed herein. However, one skilled in the art will understand that these aspects may be practiced without these details and/or in the absence of any details not described herein. In other instances, well-known structures, methods, and/or techniques associated with methods of practicing the various aspects may not be shown or described in detail to avoid unnecessarily obscuring descriptions of other details of the various aspects.

While specific aspects of the disclosure have been provided hereinabove, the disclosure may, however, be embodied in many different forms and should not be construed as necessarily being limited to only the aspects disclosed herein. Rather, these aspects may be provided so that this disclosure is thorough and complete, and fully conveys various concepts of this disclosure to skilled artisans.

Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

All numerical quantities stated herein may be approximate, unless stated otherwise. Accordingly, the term "about" may be inferred when not expressly stated. The numerical quantities disclosed herein may be to be understood as not being strictly limited to the exact numerical values recited. Instead, unless stated otherwise, each numerical value stated herein is intended to mean both the recited value and a functionally equivalent range surrounding that value. At the very least, and not as an attempt to limit the application of the doctrine of equivalents to the scope of the claims, each numerical value should at least be construed in light of the number of reported significant digits and by applying ordinary rounding processes. Typical exemplary degrees of error may be within 20%, 10%, or 5% of a given value or range of values. Alternatively, the term "about" refers to values within an order of magnitude, potentially within 5-fold or 2-fold of a given value. Notwithstanding the approximations of numerical quantities stated herein, the numerical quantities described in specific examples of actual measured values may be reported as precisely as possible. Any numerical values, however, inherently contain certain errors necessarily resulting from the standard deviation found in their respective testing measurements.

All numerical ranges stated herein include all sub-ranges subsumed therein. For example, a range of "1 to 10" or "1-10" is intended to include all sub-ranges between and including the recited minimum value of 1 and the recited maximum value of 10 because the disclosed numerical ranges may be continuous and include every value between the minimum and maximum values. Any maximum numerical limitation recited herein is intended to include all lower numerical limitations. Any minimum numerical limitation recited herein is intended to include all higher numerical limitations.

Features or functionality described with respect to certain example aspects may be combined and sub-combined in and/or with various other example aspects. Also, different aspects and/or elements of example aspects, as disclosed herein, may be combined and sub-combined in a similar manner as well. Further, some example aspects, whether individually and/or collectively, may be components of a larger system, wherein other procedures may take precedence over and/or otherwise modify their application. Additionally, a number of steps may be required before, after, and/or concurrently with example aspects, as disclosed herein. Note that any and/or all methods and/or processes, at least as disclosed herein, may be at least partially performed via at least one entity or actor in any manner.

All documents cited herein may be incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular aspects have been illustrated and described, it would be obvious to those skilled in the art that various other changes and modifications may be made without departing from the spirit and scope of the invention. Those skilled in the art will recognize or be able to ascertain using no more than routine experimentation, numerous equivalents to the specific apparatuses and methods described herein, including alternatives, variants, additions, deletions, modifications, and substitutions. This application including the appended claims is therefore intended to cover all such changes and modifications that may be within the scope of this application.

DESCRIPTION

The present disclosure provides a computer-implemented and software-controlled method 100 (FIG. 1) for performing a respirator fit testing using a virtual operator. The method 100 may instruct a user to select a respirator 105 and instruct the user to connect at least one set of tubing to the respirator and a fit testing device 110. The method 100 may instruct a user to select a respirator from a group of respirators of different sizes and/or may instruct a user to select a respirator from a menu present on a graphical user interface. The method 100 may instruct a user to attach a first end of at least one tubing to at least one adapter to attach the tubing to the respirator and a second end of the at least one tubing to at least one connector on the fit testing device. An adapter and/or probe may be used to connect the respirator to the fit testing device.

The method 100 may then instruct the user to don the respirator 115. Instructing the user to don the respirator 115 may include displaying images and/or videos on a graphical user interface to indicate how to properly place the respirator on a user's face. The images and/or videos may indicate how to correctly place the respirator such that the respirator is donned over the nose and mouth of the user. The method 100 may indicate to the user the correct placement of at least one strap of a respirator, including, but not limited to, brow straps, temple straps, and chin straps. The method 100 may instruct the user how to resize the straps by increasing or decreasing the length of each strap.

The method 100 may then prompt the user to begin the respirator fit test 120 and perform the respirator fit test upon receiving a positive response from the user 125. Performing the respirator fit test 125 may include instructions to perform at least one exercise. The method 100 may prompt the user to begin CNP, CNC, or similar quantitative fit testing methods. While CNP and CNC have been described, other quantitative fit testing methods are possible and within the scope of the present disclosure. The at least one exercise may be different depending on the quantitative fit testing method used. Generally, the at least one exercise may include, but is not limited to, instructing the user to: breath normally, breathe deeply, breathe slowly, turn head slowly from side to side, move head slowly up and down, talk, bend at the waist, bend over, jog in place, nod head up and down, grimace, or any combination thereof.

Instructing a user to breathe normally may comprise instructing a user to maintain a standing up posture with a straight back, and without talking or whispering, the user may be instructed to breathe at a normal pace.

Instructing a user to breathe deeply may comprise instructing a user to maintain a standing up posture with a straight back, and without talking or whispering, the user may be instructed to breathe slowly and deeply without hyperventilation.

Instructing a user to turn head slowly from side to side may comprise instructing a user to maintain a standing up posture, and without talking or whispering, the user may be instructed to slowly turn the head side to side to the end of the turn on each side. It may be necessary to keep the head turned at the end of each turn momentarily to enable the user to inhale in each of the turns.

Instructing a user to move head up and down may comprise instructing a user to maintain a standing up posture, and without talking or whispering, the user may be instructed to slowly move his head up and down, flexing and extending his neck respectively. The user may be instructed to inhale in the position that allows the user to look at the ceiling.

Instructing a user to talk may comprise instructing a user to maintain a standing up posture and instructions to talk out loud slowly at a level and pace wherein the words could be heard and understood by a person standing nearby. The worker may read a prepared text, count numbers, or speak randomly.

Instructing a user to grimace may comprise instructing a user to maintain a standing up posture and instructions to grimace as if the user was smiling and then in a bad mood.

Instructing a user to bend at the waist may comprise instructing a user to bend down as if the user was reaching for his toes.

For International Organization for Standardization (ISO) CNC fit testing, the at least one exercise may include, but is not limited to, instructing the user to: breath normally, breath slowly and deeply, turn head slowly from side to side, move head slowly up and down, talk, bend at the waist, breath normally, or any combination thereof.

For Occupational Safety and Health Administration (OSHA) CNC fit testing, the at least one exercise may include, but is not limited to, instructing the user to: bend at the waist, jog in place comfortably, turn head slowly side to side, move head slowly up and down, or any combination thereof.

For OSHA Fast FFR CNC, the at least one exercise may include, but is not limited to, instructing the user to: bend at the waist, talk, turn head slowly side to side, move head slowly up and down, or any combination thereof.

For CSA Group CNC, the at least one exercise may include, but is not limited to, instructing the user to: breathe normally, breathe deeply, turn head side to side, nod head up and down, talk, bend at the waist, breathe normally, or any combination thereof.

For Health and Safety Executive (HSE) CNC, the at least one exercise may include, but is not limited to, instructing the user to: breathe normally, breathe slowly and deeply, turn head slowly side to side, move head slowly up and down, talk, bend at the waist, breathe normally, or any combination thereof.

The method 100 may then detect using a processor, at any time during the respirator fit test, a signal from the respirator fit testing device 130 indicating that the respirator fit test is being performed and collecting data. Data may be collected from a signal during each exercise. The data collected from a signal may be the result of a measurement from the fit testing device, including, but not limited to, air flow, air volume, air leakage, particle count, pressure, or any other type of measurement for qualitative or quantitative fit methods.

For CNP, the method may create a pressure within the respirator to establish a "challenge pressure" within the facepiece of the respirator. As used herein, a "challenge pressure" refers to any pressure established within a respirator in which the fit testing device attempts to maintain that pressure within the respirator. The method may attempt to maintain the challenge pressure by removing and/or inserting air.

The method may determine a modeled breathing rate associated with the challenge pressure. As used herein, "modeled breathing rate" refers to the total volume of air pulled in by the respirator over time. For example, the modeled breathing rate may be the total volume of air constantly inhaled by a user over 8 seconds.

The method may determine a leak rate using the fit testing device, wherein the leak rate may refer to the amount of air removed from the mask to maintain the challenge pressure (cc/min). The method 100 may then analyze, using a processor, the data of the respirator fit test for each exercise on the processor 135. Analysis of the data of the respirator fit test 135 may comprise calculating a fit factor. The method 100 may calculate a fit factor at any point in time during the respirator fit test. The method 100 may calculate at least one individual fit factor for each individual exercise during the respirator fit test.

For CNP, an individual fit factor may be calculated by:
(EQ. 1)

$$\text{individual fit factor} = \frac{\text{modeled breathing rate}}{\text{leak rate}}$$

While EQ. 1 has been described, other methods of calculating an individual fit factor are possible and within the scope of the present disclosure.

A passing individual fit factor indicates that the respirator fits properly during the exercise, and a failure has not been detected. The calculated fit factor must reach a certain threshold amount to be a passing individual fit factor. Generally, a passing individual fit factor may be a fit factor of at least 100, including without limitation, at least 100, 150, 200, 250, 300, 350, 400, 450, 500, 550, 600, 650, 700, 750, 800, 850, 900, 950, 1000, 2000, 3000, 4000, 5000, 6000, 7000, and at least 8000. Any combination of lower and upper limits may define the passing individual fit factor, such as, 100-200, 200-300, 300-400, 400-500, 500-600, 600-700, 700-800, 800-900, 900-1000, 1000-2000, 2000-3000, 3000-4000, 4000-6000, and 6000-8000. The value of a passing individual fit factor may be dependent on the type of respirator, type of fit testing method, type of exercise, and type of national or international standard for respirator fit testing.

A failing individual fit factor indicates that there is a failure in the fit of the respirator during the exercise. A failure may include, but is not limited to, a leak, broken seal, failure to hold breath, inadequate breath taken, improper placement of inhalation valve, error in tubing, incomplete connection of an adapter, incomplete connection of a tube, and the like. Generally, a failing individual fit factor may be a fit factor less than 100, including without limitation, 99, 90, 80, 70, 60, 50, 40, 30, 20, 10, and 0. Any combination of lower and upper limits may define the failing overall fit factor, such as, 0-10, 10-20, 20-30, 30-40, 40-50, 50-60, 60-70, 70-80, 80-90, and 90-99. The value of a failing individual fit factor may be dependent on the type of respirator, type of exercise, type of fit testing method, and type of national or international standard for respirator fit testing.

The method 100 may calculate an overall fit factor using individual exercise fit factors by converting the exercise fit factors to penetration values, determining the average, and then converting that result back to a fit factor. Accordingly, the method 100 may calculate the overall fit factor using the following equation:
(EQ. 2)

$$\text{Overall fit factor} = \frac{\text{Number of exercises}}{\frac{1}{ff_1} + \frac{1}{ff_2} + \frac{1}{ff_3} + \frac{1}{ff_4} + \frac{1}{ff_5} + \frac{1}{ff_6} + \frac{1}{ff_7} + \frac{1}{ff_8}}$$

wherein $ff_1$, $ff_2$, $ff_3$, etc. are the individual fit factors for each exercise. EQ. 2 may be adjusted to the number of exercises performed by the user according to the method 100 of the present disclosure. While EQ. 2 has been described, other methods of calculating an overall fit factor are possible and within the scope of the present disclosure.

The method 100 may determine a passing overall fit factor or a failing overall fit factor. A passing overall fit factor indicates that the respirator fits properly, and a failure has not been detected. The calculated fit factor must reach a certain threshold amount to be a passing overall fit factor. Generally, a passing overall fit factor may be a fit factor of at least 100, including without limitation, at least 100, 150, 200, 250, 300, 350, 400, 450, 500, 550, 600, 650, 700, 750, 800, 850, 900, 950, 1000, 2000, 3000, 4000, 5000, 6000, 7000, and at least 8000. Any combination of lower and upper limits may define the passing overall fit factor, such as, 100-200, 200-300, 300-400, 400-500, 500-600, 600-700, 700-800, 800-900, 900-1000, 1000-2000, 2000-3000, 3000-4000, 4000-6000, and 6000-8000. The value of a passing overall fit factor may be dependent on the type of respirator, type of fit testing method, and type of national or international standard for respirator fit testing.

A failing overall fit factor indicates that there is a failure in the fit of the respirator. A failure may include, but is not limited to, a leak, broken seal, failure to hold breath, inadequate breath taken, improper placement of inhalation valve, error in tubing, incomplete connection of an adapter, incomplete connection of a tube, and the like. Generally, a failing overall fit factor may be a fit factor less than 100, including without limitation, 99, 90, 80, 70, 60, 50, 40, 30, 20, 10, and 0. Any combination of lower and upper limits may define the failing overall fit factor, such as, 0-10, 10-20, 20-30, 30-40, 40-50, 50-60, 60-70, 70-80, 80-90, and 90-99.

The value of a failing overall fit factor may be dependent on the type of respirator, type of fit testing method, and type of national or international standard for respirator fit testing.

For a half-facepiece air purifying respirator using CNP or CNC under CSA, OSHA, or ISO standards, the passing overall fit factor may be a fit factor of at least 100, including without limitation, at least 100, 150, 200, 250, 300, 350, 400, 450, 500, 550, 600, 650, 700, 750, 800, 850, 900, 950, 1000, 2000, 3000, 4000, 5000, 6000, 7000, and at least 8000. Any combination of lower and upper limits may define the passing overall fit factor, such as, 100-200, 200-300, 300-400, 400-500, 500-600, 600-700, 700-800, 800-900, 900-1000, 1000-2000, 2000-3000, 3000-4000, 4000-6000, and 6000-8000. The failing overall fit factor may be a fit factor less than 100, including without limitation, 99, 90, 80, 70, 60, 50, 40, 30, 20, 10, and 0. Any combination of lower and upper limits may define the failing overall fit factor, such as, 0-10, 10-20, 20-30, 30-40, 40-50, 50-60, 60-70, 70-80, 80-90, and 90-99.

For a full-facepiece air purifying respirator quantitative fit testing using CNP or CNC under CSA, OSHA, or ISO standards, the passing overall fit factor may be a fit factor of at least 500, including without limitation, at least 500, 600, 700, 800, 900, 1000, 2000, 3000, 4000, 5000, 6000, 7000, and at least 8000. Any combination of lower and upper limits may define the passing overall fit factor, such as, 500-600, 600-700, 700-800, 800-900, 900-1000, 1000-2000, 2000-3000, 3000-4000, 4000-6000, and 6000-8000. The failing overall fit factor may be a fit factor less than 500, including without limitation, 499, 450, 400, 350, 300, 250, 200, 150, 100, 50, and 0. Any combination of lower and upper limits may define the failing overall fit factor, such as, 0-50, 50-100, 100-150, 150-200, 200-250, 250-300, 300-350, 350-400, 400-450, and 450-499.

For a half-facepiece powered air purifying respirator using CNP or CNC under CSA, OSHA, or ISO standards, the passing overall fit factor may be a fit factor of at least 100, including without limitation, at least 100, 150, 200, 250, 300, 350, 400, 450, 500, 550, 600, 650, 700, 750, 800, 850, 900, 950, 1000, 2000, 3000, 4000, 5000, 6000, 7000, and at least 8000. Any combination of lower and upper limits may define the passing overall fit factor, such as, 100-200, 200-300, 300-400, 400-500, 500-600, 600-700, 700-800, 800-900, 900-1000, 1000-2000, 2000-3000, 3000-4000, 4000-6000, and 6000-8000. The failing overall fit factor may be a fit factor less than 100, including without limitation, 99, 90, 80, 70, 60, 50, 40, 30, 20, 10, and 0. Any combination of lower and upper limits may define the failing overall fit factor, such as, 0-10, 10-20, 20-30, 30-40, 40-50, 50-60, 60-70, 70-80, 80-90, and 90-99.

For a full facepiece powered air purifying respirator under CSA, OSHA, or CNP ISO standards, the passing overall fit factor may be a fit factor of at least 500, including without limitation, at least 500, 600, 700, 800, 900, 1000, 2000, 3000, 4000, 5000, 6000, 7000, and at least 8000. Any combination of lower and upper limits may define the passing overall fit factor, such as, 500-600, 600-700, 700-800, 800-900, 900-1000, 1000-2000, 2000-3000, 3000-4000, 4000-6000, and 6000-8000. The failing overall fit factor may be a fit factor less than 500, including without limitation, 499, 450, 400, 350, 300, 250, 200, 150, 100, 50, and 0. Any combination of lower and upper limits may define the failing overall fit factor, such as, 0-50, 50-100, 100-150, 150-200, 200-250, 250-300, 300-350, 350-400, 400-450, and 450-499.

For a full facepiece powered air purifying respirator using CNC under ISO standards, the passing overall fit factor may be a fit factor of at least 2000, including, without limitation, at least 2000, 3000, 4000, 5000, 6000, 8000, and at least 10000. Any combination of lower and upper limits may define the passing overall fit factor, such as 2000-3000, 3000-4000, 4000-5000, 5000-6000, 6000-8000, and 8000 to 10000. The failing overall fit factor may be a fit factor less than 2000, including without limitation, 1999, 1750, 1500, 1250, 1000, 750, 500, 250, and 0. Any combination of lower and upper limits may define the failing overall fit factor, such as, 0-250, 250-500, 500-750, 750-1000, 1000-1250, 1250-1500, 1500-1750, and 1750-1999.

For a half-facepiece continuous flow supplied air respirator under CSA standards, the passing overall fit factor may be a fit factor of at least 500, including without limitation, at least 500, 600, 700, 800, 900, 1000, 2000, 3000, 4000, 5000, 6000, 7000, and at least 8000. Any combination of lower and upper limits may define the passing overall fit factor, such as, 500-600, 600-700, 700-800, 800-900, 900-1000, 1000-2000, 2000-3000, 3000-4000, 4000-6000, and 6000-8000. The failing overall fit factor may be a fit factor less than 500, including without limitation, 499, 450, 400, 350, 300, 250, 200, 150, 100, 50, and 0. Any combination of lower and upper limits may define the failing overall fit factor, such as, 0-50, 50-100, 100-150, 150-200, 200-250, 250-300, 300-350, 350-400, 400-450, and 450-499.

For a half-facepiece continuous flow supplied air respirator under OSHA and ISO standards, the passing overall fit factor may be a fit factor of at least 100, including without limitation, at least 100, 150, 200, 250, 300, 350, 400, 450, 500, 550, 600, 650, 700, 750, 800, 850, 900, 950, 1000, 2000, 3000, 4000, 5000, 6000, 7000, and at least 8000. Any combination of lower and upper limits may define the passing overall fit factor, such as, 100-200, 200-300, 300-400, 400-500, 500-600, 600-700, 700-800, 800-900, 900-1000, 1000-2000, 2000-3000, 3000-4000, 4000-6000, and 6000-8000. The failing overall fit factor may be a fit factor less than 100, including without limitation, 99, 90, 80, 70, 60, 50, 40, 30, 20, 10, and 0. Any combination of lower and upper limits may define the failing overall fit factor, such as, 0-10, 10-20, 20-30, 30-40, 40-50, 50-60, 60-70, 70-80, 80-90, and 90-99.

For a full facepiece continuous flow supplied air respirator under CSA, OSHA, or CNP ISO standards, the passing overall fit factor may be a fit factor of at least 500, including without limitation, at least 500, 600, 700, 800, 900, 1000, 2000, 3000, 4000, 5000, 6000, 7000, and at least 8000. Any combination of lower and upper limits may define the passing overall fit factor, such as, 500-600, 600-700, 700-800, 800-900, 900-1000, 1000-2000, 2000-3000, 3000-4000, 4000-6000, and 6000-8000. The failing overall fit factor may be a fit factor less than 500, including without limitation, 499, 450, 400, 350, 300, 250, 200, 150, 100, 50, and 0. Any combination of lower and upper limits may define the failing overall fit factor, such as, 0-50, 50-100, 100-150, 150-200, 200-250, 250-300, 300-350, 350-400, 400-450, and 450-499.

For a full facepiece continuous flow supplied air respirator under CNC ISO standards, the passing overall fit factor may be a fit factor of at least 2000, including, without limitation, at least 2000, 3000, 4000, 5000, 6000, 8000, and at least 10000. Any combination of lower and upper limits may define the passing overall fit factor, such as 2000-3000, 3000-4000, 4000-5000, 5000-6000, 6000-8000, and 8000 to 10000. The failing overall fit factor may be a fit factor less than 2000, including without limitation, 1999, 1750, 1500, 1250, 1000, 750, 500, 250, and 0. Any combination of lower and upper limits may define the failing overall fit factor, such as, 0-250, 250-500, 500-750, 750-1000, 1000-1250, 1250-1500, 1500-1750, and 1750-1999.

For a half-facepiece air line respirator under CSA standards, the passing overall fit factor may be a fit factor of at least 500, including without limitation, at least 500, 600, 700, 800, 900, 1000, 2000, 3000, 4000, 5000, 6000, 7000, and at least 8000. Any combination of lower and upper limits may define the passing overall fit factor, such as, 500-600, 600-700, 700-800, 800-900, 900-1000, 1000-2000, 2000-3000, 3000-4000, 4000-6000, and 6000-8000. The failing overall fit factor may be a fit factor less than 500, including without limitation, 499, 450, 400, 350, 300, 250, 200, 150, 100, 50, and 0. Any combination of lower and upper limits may define the failing overall fit factor, such as, 0-50, 50-100, 100-150, 150-200, 200-250, 250-300, 300-350, 350-400, 400-450, and 450-499.

For a half-facepiece air line respirator under OSHA and ISO standards, the passing overall fit factor may be a fit factor of at least 100, including without limitation, at least 100, 150, 200, 250, 300, 350, 400, 450, 500, 550, 600, 650, 700, 750, 800, 850, 900, 950, 1000, 2000, 3000, 4000, 5000, 6000, 7000, and at least 8000. Any combination of lower and upper limits may define the passing overall fit factor, such as, 100-200, 200-300, 300-400, 400-500, 500-600, 600-700, 700-800, 800-900, 900-1000, 1000-2000, 2000-3000, 3000-4000, 4000-6000, and 6000-8000. The failing overall fit factor may be a fit factor less than 100, including without limitation, 99, 90, 80, 70, 60, 50, 40, 30, 20, 10, and 0. Any combination of lower and upper limits may define the failing overall fit factor, such as, 0-10, 10-20, 20-30, 30-40, 40-50, 50-60, 60-70, 70-80, 80-90, and 90-99.

For a full facepiece or SCBA full facepiece pressure demand respirator under CSA standards, the passing overall fit factor may be a fit factor of at least 1000, including without limitation, at least 1000, 2000, 3000, 4000, 5000, 6000, 7000, and at least 8000. Any combination of lower and upper limits may define the passing overall fit factor, such as 1000-2000, 2000-3000, 3000-4000, 4000-5000, 5000-6000, 6000-7000, and 7000-8000. The failing overall fit factor may be a fit factor less than 1000, including without limitation 999, 900, 800, 700, 600, 500, 400, 300, 200, 100, and 0. Any combination of lower and upper limits may define the failing overall fit factor, such as, 0-100, 100-200, 200-300, 300-400, 400-500, 500-600, 600-700, 700-800, 800-900, and 900-999.

For a full facepiece or SCBA full facepiece pressure demand respirator under OSHA or CNP ISO standards, the passing overall fit factor may be a fit factor of at least 500, including without limitation, at least 500, 600, 700, 800, 900, 1000, 2000, 3000, 4000, 5000, 6000, 7000, and at least 8000. Any combination of lower and upper limits may define the passing overall fit factor, such as, 500-600, 600-700, 700-800, 800-900, 900-1000, 1000-2000, 2000-3000, 3000-4000, 4000-6000, and 6000-8000. The failing overall fit factor may be a fit factor less than 500, including without limitation, 499, 450, 400, 350, 300, 250, 200, 150, 100, 50, and 0. Any combination of lower and upper limits may define the failing overall fit factor, such as, 0-50, 50-100, 100-150, 150-200, 200-250, 250-300, 300-350, 350-400, 400-450, and 450-499.

For a full facepiece or SCBA full facepiece pressure demand respirator under CNC ISO standards, the passing overall fit factor may be a fit factor of at least 2000, including, without limitation, at least 2000, 3000, 4000, 5000, 6000, 8000, and at least 10000. Any combination of lower and upper limits may define the passing overall fit factor, such as 2000-3000, 3000-4000, 4000-5000, 5000-6000, 6000-8000, and 8000 to 10000. The failing overall fit factor may be a fit factor less than 2000, including without limitation, 1999, 1750, 1500, 1250, 1000, 750, 500, 250, and 0. Any combination of lower and upper limits may define the failing overall fit factor, such as, 0-250, 250-500, 500-750, 750-1000, 1000-1250, 1250-1500, 1500-1750, and 1750-1999.

The method may collect at least one data point from at least one signal during an exercise. The at least one data point may comprise quantitative measurements from each individual exercise and/or the overall quantitative fit test. The at least one data point may also comprise a delta or change in a quantitative measurement or a total amount of a quantitative measurement over a predetermined amount of time. The quantitative measurement of the at least one data point may include, but is not limited to, modeled breathing rate, leak rate, established challenge pressure, air flow, air volume, air leakage, particle count, pressure, or any other type of measurement for quantitative fit methods. The at least one data point may be displayed to the user on a graphical user interface or may remain hidden from the user. In one aspect, the at least one data point may be collected each second for a total of eight seconds. The quantitative measurement may be dependent on the type of respirator, type of fit testing method, type of measurement, type of data, or type of signal detected.

The method may then analyze the at least one data point to determine whether a failure has occurred. Analysis may include analyzing a change in the modeled breathing rate and/or leak rate. Analysis may include calculating an individual fit factor according to the methods of the present disclosure. Analysis may also include a comparison to the established challenge pressure.

The method may generate at least one graph of at least two data points collected from at least one signal during an exercise. The graph may display quantitative measurements from each individual exercise or the overall quantitative fit test. The graph may display quantitative data at each data point, including, but not limited to, modeled breathing rate, leak rate, established challenge pressure, air flow, air volume, air leakage, particle count, pressure, or any other type of measurement for quantitative fit methods. The graph may also display a delta or change in a quantitative measurement or a total amount of a quantitative measurement over a period of time. The graph may be displayed to the user on a graphical user interface or may remain hidden from the user. In one aspect, at least one data point may be collected each second for a total of eight seconds.

The method may then analyze the graph to determine whether a failure has occurred. Analysis may include analyzing a change in the modeled breathing rate and/or leak rate. Analysis may include calculating an individual fit factor according to the methods of the present disclosure. Analysis may also include a comparison to the established challenge pressure. A quantitative failure may be detected when a failing fit factor is detected. A failing fit factor may refer to an individual failing fit factor or an overall failing fit factor.

When the method calculates a failing fit factor, the method 100 may then troubleshoot at least one failure of the respirator fit test when a failing fit factor is detected 140. Troubleshooting at least one failure of the respirator fit test 140 may include, but is not limited to, prompting the user to remove the respirator, prompting the user to select a different respirator size, prompting the user to ensure all connections of the at least one adapter, respirator, and fit testing device are correct, prompting a user to ensure a correct breath is taken, prompting a user to ensure a correct breath hold, prompting a user to decrease movement, increasing the amount of particles, decreasing the amount of particles, prompting a user to increase movement, prompting a user to fix a leak, prompting a user to select a different respirator of the same size, prompting a user to replace or remove an exhalation valve, prompting a user to replace or remove an inhalation valve, prompting a user to insert the probe, prompting a user to insert at least one filter, prompting a user to pinch the nose bridge of the respirator, prompting the user to insert a valve prop in the inhalation valve, prompting a user to remove the inhalation valve, prompting a user to ensure correct connection of at least one hose or tubing, prompting a user to ensure correct connection of at least one adapter or probe, and the like. Troubleshooting may be specific to the type of failure detected. For example, if the methods and systems of the present disclosure detect a failure due to a leak in the respirator, the methods may troubleshoot the failure with at least one troubleshooting option specific to the failure, including but not limited to, prompting a user to fix the leak, prompting a user to select a different respirator size, and prompting a user to ensure correct connection of the adapter and the fit testing device. The method may display to the user a subset of videos on a graphical user interface to correct the failure 145.

The method may troubleshoot at least one failure of the respirator fit test when a quantitative failure is detected after analysis of at least one graph.

The videos may comprise instructions or directions that may provide remedies for a failure. The method may select a video for the user that is specific to the type of failure detected. After detecting a failure, the method may determine a cause of the failure. Then the method may prompt the user to perform a specific task to troubleshoot the cause of the failure. For example, a video may instruct a user how to correct the connection of the at least one adapter and/or at least one tubing to the respirator and fit testing device if the method detects a failure in at least one connection. A video may instruct a user how to don the respirator, how to select a respirator size, and/or how to perform any of the troubleshooting described above. The method may prompt the user to replay the video at least a second time.

After displaying at least one video 145, the method 100 may perform the respirator fit test at least a second time 150 using the methods and systems described herein. The respirator fit test may be performed as many times as necessary until a passing fit factor is determined. The method 100 may be repeated at least two times, including, at least 2, 3, 4, 5, 6, 7, 8, 9, and at least 10 times until an overall passing fit factor is determined. In certain aspects, the method may not determine an overall failing fit factor and may only calculate an overall passing fit factor. Thus, the method may inform the user of a passing respirator fit test without performing the respirator fit test at least a second time and without troubleshooting.

Once an overall fit factor has been calculated, the method may display a result on the graphical user interface. The result may indicate to the user a passing respirator fit test, a failing respirator fit test, or an error. The method may display a QR code on the graphical user interface, wherein the QR code may notify the user of the result. The notification may be in the form of a text message or an electronic mail. The notification may also be formatted so that it may be distributed in paper form.

Conventional respirator fit testing may be performed by a person who is qualified in the testing methods. A human fit test operator often detects and troubleshoots fit testing failures by starting with what is the most likely source of failure based on that operator's experience. Thus, human fit testing proctors are unable to detect and troubleshoot certain method specific fit test exercise failures that are not evident to the human senses. The present disclosure provides methods and systems to efficiently detect and troubleshoot failures in respirator fitting processes without a need for a human proctor, including failures undetectable and not addressable by a human proctor.

Figure 2:
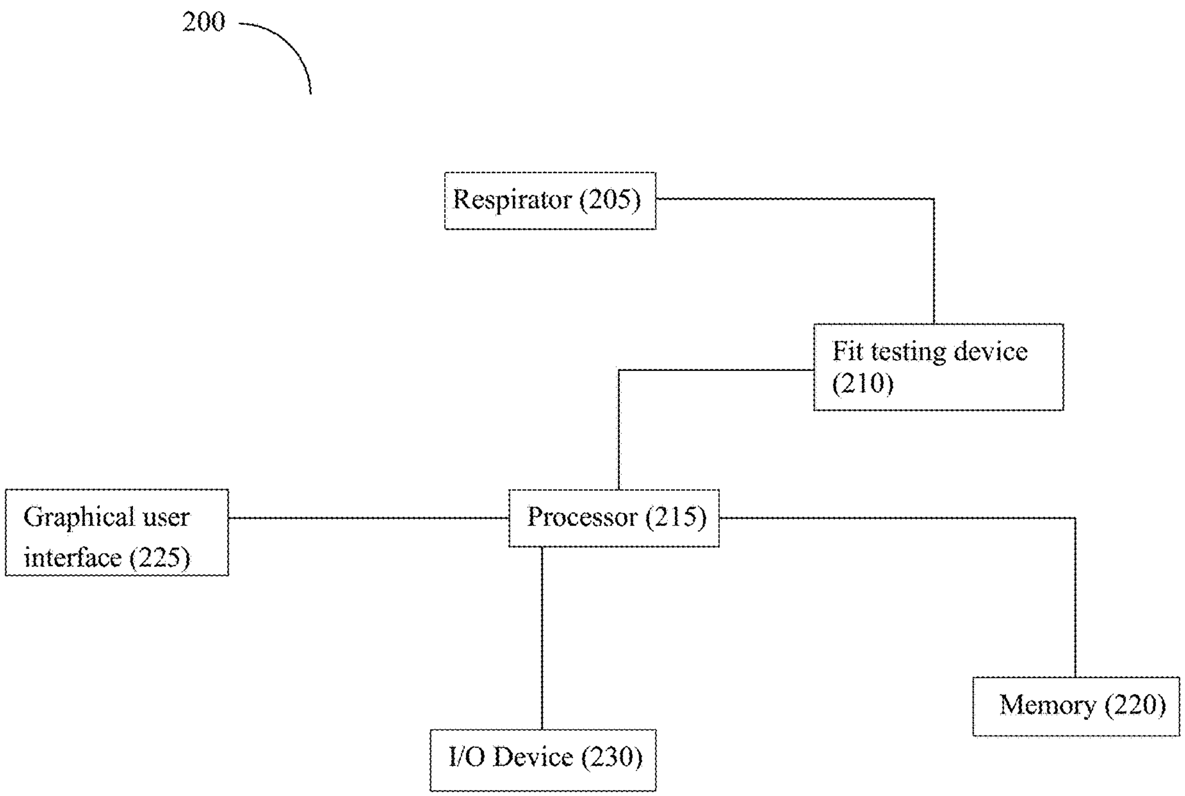
FIG. 2 includes a block diagram of a system for performing a respirator fit test, in accordance with certain aspects of the presently disclosed invention described herein.

FIG. 2 is a block diagram that schematically illustrates a system according to the present disclosure. The system 200 may comprise a processor 215 that interfaces with memory 220 (which may be separate from or included as part of processor 215). The memory 220 may also employ cloud-based memory. In one aspect, the system may connect to a base station that includes memory and processing capabilities. The system may further comprise an I/O device 230.

The present disclosure provides systems for performing a respirator fit test. Memory 220 has stored therein a number of routines that are executable by processor 215. The processor 215, in communication with the memory 220, may be configured to execute a virtual operator respirator fit test.

The virtual operator fit test executed by the processor 215, in communication with the memory 220, may be controlled negative pressure or condensation nuclei counting, or any similar method thereof including, but not limited to, ISO CNC, OSHA Fast Fit CNC, OSHA Fast Fit for FFR CNC, CSA CNC, and HSE CNC.

The virtual operator fit test may comprise program instructions according to the methods of the present disclosure to instruct a user to select a respirator 205, connect at least one adapter and/or at least one tubing to the respirator 205 and a fit testing device 210, don the respirator 205, and begin the respirator fit test. The virtual operator fit test may then comprise program instructions to perform the respirator fit test upon receiving a positive response from the user.

During the respirator fit test, the virtual operator fit test may detect a signal from the fit testing device 210, wherein signal data is analyzed by the processor 215 and stored in the memory 220. The virtual operator fit test may calculate at least one individual fit factor and at least one overall fit factor according to the methods of the present disclosure. The virtual operator fit test may then determine whether the at least one fit factor and/or at least one overall fit factor is passing fit factor or a failing fit factor according to the methods of the present disclosure.

If a failing fit factor is detected, the system may troubleshoot at least one failure according to the methods of the present disclosure. Troubleshooting a failure of the respirator fit test may include, but is not limited to, prompting the user to remove the respirator, and prompting the user to select a different respirator size. The system may display to the user a subset of videos on a graphical user interface 225 to correct the failure according to the methods of the present disclosure. The system may instruct the user to perform the respirator fit test at least a second time according to the methods of the present disclosure.

The systems of the present disclosure may further comprise a database. Program instructions to analyze the data of the respirator fit test on the processor may comprise program instructions to generate at least one data point and/or at least one graph comprising at least two data points according to the methods of the present disclosure. The system may further comprise program instructions to access the database, wherein the database may comprise passing or failing fit factor values according to the methods described herein, wherein the passing or failing fit factor may be dependent on the type of respirator, type of exercise, type of fit testing method, and type of national or international standard for respirator fit testing. The system may then comprise program instructions to compare the calculated individual or overall fit factor to passing or failing fit factor of the database according to the methods of the present disclosure.

In one aspect, the system may comprise program instructions to resolve at least one failure, and prompt the user to remove the respirator 205, at least one adapter, and at least one tubing. The system may display a passing result or failing result on a graphical user interface 225. The system may further display a QR code on the graphical user interface 225, wherein the QR code may notify the user of the passing or failing result. The notification may be in the form of a text message, electronic mail, or any other suitable form of communication.

The present disclosure also provides for a computer program product for performing a respirator fit test using a virtual operator, comprising at least one non-transitory computer readable medium, including program instructions that, when executed by at least one processor, cause the at least one processor to: instruct a user to select a respirator, instruct the user to connect at least one adapter and/or at least one set of tubing to a respirator and a fit testing device, instruct the user to don the respirator, prompt the user to being the respirator fit test, perform the respirator fit test upon receiving a positive response from the user, detect a signal from the respirator fit testing device, analyze data of the respirator fit test on the at least once processor, troubleshoot at least one failure of the respirator fit test, display to the user a subset of videos on a graphical user interface to correct the failure, and perform the respirator fit test at least a second time.

The computer program product of the present disclosure may perform a respirator fit test according to the methods and systems of the present disclosure.

The methods, systems, and computer program products of the present disclosure may efficiently detect and troubleshoot failures in respirator fitting processes without a need for a human proctor, especially failures undetectable and not addressable by a human proctor. As an example, a human proctor of a CNP test is not capable of sensing with sufficient accuracy a respirator wearer's inability to hold his breath. The virtual operator of the present disclosure may provide real time feedback for troubleshooting failures in a respirator fit test and may provide standardization for respirator fit testing, providing a robust solution to problems with respirator fit testing using human operators that are known in the art.

Processor 215 may be one or more microprocessors, microcontroller, an application specific integrated circuit (ASIC), a circuit containing one or more processing components, a group of distributed processing components, circuitry for supporting a microprocessor, or other suitable processing device that interfaces with memory 220. Processor 215 is also configured to execute computer code stored in memory 220 to complete and facilitate the activities described herein.

I/O device 230 (including, but not limited to, keyboards, displays, pointing devices, DASD, tape, CDs, DVDs, thumb drives and other memory media, etc.) may be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards may be just a few of the available types of network adapters.

As will be appreciated by one skilled in the art, the present disclosure may be embodied as a system, method, or computer program product. Accordingly, the present disclosure may take the form of an entirely hardware aspect, an entirely software aspect (including firmware, resident software, micro-code, etc.), or an aspect combining software and hardware aspects that may all generally be referred to herein as a "system." Furthermore, the presently disclosure may take the form of a computer program product embodied in any tangible medium of expression having computer useable program code embodied in the medium.

The present disclosure may comprise a kit comprising a computer program product for performing a respirator fit test using a virtual operator, at least one adapter and/or probe, at least one tubing, at least one respirator, at least one fit testing device, or any combination thereof.

Any combination of one or more computer useable or computer readable medium(s) may be utilized. The computer-useable or computer-readable medium may be, for example but not limited to, an electronic, magnetic, optical, electromagnetic, infrared, or semiconductor system, apparatus, device, or propagation medium. Computer-readable medium may also be an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a digital versatile disk (DVD), a memory stick, a floppy disk, a mechanically encoded device such as punch-cards or raised structures in a groove having instructions recorded thereon, and any suitable combination of the foregoing. Note that the computer-useable or computer-readable medium may be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-useable or computer-readable medium may be any medium that can contain, store, communicate, propagate, or transport the program for use by or in connection with the instruction execution system, apparatus, or device. The computer-useable program code may be transmitted using any appropriate medium, including but not limited to wireless, wireline, optical fiber cable, RF, etc.

Computer program code for carrying out operations of the presently disclosed invention may be written in any combination of one or more programming languages. The programming language may be, but is not limited to, object-oriented programming languages (Java, Smalltalk, C++, etc.) or conventional procedural programming languages ("C" programming language, etc.). The program code may execute entirely on a user's computer, partly on the user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer, which may include through the Internet using an Internet Services Provider. In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The systems and methods of the present disclosure may process data on any commercially available computer. In other aspects, a computer operating system may include, but is not limited to, Linux, Windows, UNIX, Android, or MAC OS. In one aspect of the present disclosure, the forgoing processing devices or any other electronic, computation platform of a type designed for electronic processing of digital data as herein disclosed may be used.

Aspects of the present disclosure are described with reference to flowchart illustrations and/or block diagrams of methods, systems, and computer program products according to aspects of the present disclosure. It will be understood that each block of the flowchart illustrations and/or block diagrams, and combination of blocks in the flowchart illustrations and/or block diagrams, may be implemented by computer program instructions. These computer program instructions may be provided to a processor of a general-purpose computer, special purpose computer, or other programmable data processing apparatus to produce a machine, which the instructions execute via the processor of the computer or other programmable data processing apparatus allowing for the implementation of the steps specified in the flowchart and/or block diagram blocks or blocks.

Various aspects of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code to reduce the number of times code must be retrieved from bulk storage during execution.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others.

Aspects

Aspect 1: A computer-implemented and software-controlled method to perform a respirator fit test, the method comprising: instructing a user to select a respirator; instructing the user to connect at least one set of tubing to the respirator and a fit testing device; instructing the user to don the respirator; prompting the user to begin the respirator fit test; performing the respirator fit test upon receiving a positive response from the user; detecting at a processor, a signal from the respirator fit testing device; analyzing data of the respirator fit test on the processor; troubleshooting at least one failure of the respirator fit test when a failing fit factor is detected; displaying to the user a subset of videos on a graphical user interface to correct the failure; and, performing the respirator fit test at least a second time.

Aspect 2: The method of aspect 1, wherein the respirator fit test is controlled negative pressure.

Aspect 3: The method of aspect 1, wherein the respirator fit test is condensation nuclei counting.

Aspect 4: The method of any of the foregoing aspects, wherein performing the respirator fit test upon receiving a positive response from the user comprises instructing the user to perform at least one exercise.

Aspect 5: The method of any of the foregoing aspects, wherein at least one exercise comprises: instructing the user to face forward; instructing the user to face upward; instructing the user to face downward; instructing the user to bend downward and look left; and instructing the user to bend downward and look right.

Aspect 6: The method of any of the foregoing aspects, wherein at least one exercise comprises: instructing the user to breathe normally; instructing the user to breathe slowly and deeply; instructing the user to turn a head slowly side to side; instructing the user to move the head slowly up and down; instructing the user to talk; instructing the user to bend at the waist; and instructing the user to breathe normally.

Aspect 7: The method of any of the foregoing aspects, wherein at least one exercise comprises: instructing the user to bend at the waist; instructing the user to jog in place; instructing the user to turn a head slowly side to side; and instructing the user to move the head slowly up and down.

Aspect 8: The method of any of the foregoing aspects, wherein at least one exercise comprises: instructing the user to bend at the waist; instructing the user to talk; instructing the user to turn a head slowly side to side; instructing a user to move the head slowly up and down.

Aspect 9: The method of any of the foregoing aspects, wherein at least one exercise comprises: instructing the user to breathe normally; instructing the user to breathe deeply; instructing the user to turn a head side to side; instructing a user to nod the head up and down; instructing a user to talk; instructing a user to bend at the waist; and instructing a user to breathe normally.

Aspect 10: The method of any of the foregoing aspects, wherein at least one exercise comprises: instructing the user to breathe normally; instructing the user to breathe slowly and deeply; instructing the user to turn a head slowly side to side; instructing the user to move the head slowly up and down; instructing the user to talk; instructing the user to bend at the waist; and instructing the user to breathe normally.

Aspect 11: The method of any of the foregoing aspects, wherein analyzing data of the respirator fit test on the processor comprises: calculating at least one fit factor for at least one exercise; calculating an overall fit factor for the respirator fit test; and determining at least one failure or at least one pass of the respirator fit test.

Aspect 12: The method of any of the foregoing aspects, wherein troubleshooting a failure of the respirator fit test comprises, prompting the user to remove the respirator, and prompting the user to select a different respirator size.

Aspect 13: The method of any of the forgoing aspects, comprising resolving at least one failure; prompting the user to remove the respirator, at least one adapter, and at least one tubing; displaying a result on the graphical user interface; and, displaying a QR code on the graphical user interface, wherein the QR code may notify the user of the result.

Aspect 14: The method of any of the foregoing aspects, wherein the notification may be a text message or an electronic mail.

Aspect 15: The method of any of the foregoing aspects, wherein the signal generates particle count data.

Aspect 16: The method of any of the foregoing aspects, wherein the signal generates pressure data.

Aspect 17: The method of any of the foregoing aspects, wherein analyzing the data of the respirator fit test on the processor comprises: collecting at least one data point from the signal.

Aspect 18: The method of any of the foregoing aspects, wherein analyzing the data of the respirator fit test on the processor comprises: collecting at least two data points from the signal; and generating a graph of the at least two data points.

Aspect 19: The method according to any of the foregoing aspects, wherein the at least one data point is collected each second for eight seconds.

Aspect 20: The method according to any of the foregoing aspects, wherein troubleshooting a failure of the respirator fit test comprises: detecting a failure; determining a cause of the failure; and prompting the user to perform a specific task to troubleshoot the cause of the failure.

Aspect 21: A system for performing a respirator fit test, the system comprising: a processor; and a memory storing computer-readable instructions that, when executed by the processor, cause the processor to trigger execution of a virtual operator respirator fit test, wherein the virtual operator respirator fit test comprises program instructions to: instruct a user to select a respirator; instruct the user to connect at least one tubing to the respirator and a fit testing device; instruct the user to don the respirator; prompt the user to begin the respirator fit test; perform the respirator fit test upon receiving a positive response from the user; detect a signal from the fit testing device; analyze data of the respirator fit test on the processor; troubleshoot at least one failure of the respirator fit test when a failing fit factor is detected; display to the user a subset of videos on a graphical user interface to correct the failure; and, perform the respirator fit test at least a second time.

Aspect 22: The system of aspect 21, wherein the respirator fit test is controlled negative pressure.

Aspect 23: The system of aspect 21, wherein the respirator fit test is condensation nuclei counting.

Aspect 24: The system of any of the foregoing aspects, comprising program instructions to: resolve at least one failure; prompt the user to remove the respirator, at least one adapter, and at least one tubing; display a result on the graphical user interface; and display a QR code on the graphical user interface, wherein the QR code may notify the user of the result.

Aspect 25: The system of any of the foregoing aspects, wherein analyzing data of the respirator fit test on the processor comprises: calculating at least one fit factor for at least one exercise; calculating an overall fit factor for the respirator fit test; and determining at least one failure or at least one pass of the respirator fit test.

Aspect 26: The system of any of the foregoing aspects, wherein troubleshooting a failure of the respirator fit test comprises, prompting the user to remove the respirator, and prompting the user to select a different respirator size.

Aspect 27: The system of any of the foregoing aspects, wherein program instructions to analyze the data of the respirator fit test on the processor comprises program instructions to: collect at least one data point from the signal.

Aspect 28: The system of any of the foregoing aspects, wherein program instructions to analyze the data of the respirator fit test on the processor comprises program instructions to: collect at least two data points from the signal; and generate a graph of that at least two data points.

Aspect 29: A computer program product for performing a respirator fit test using a virtual operator, comprising at least one non-transitory computer readable medium including program instruction that, when executed by at least one processor, cause the at least one processor to: instruct a user to select a respirator; instruct the user to connect at least one set of tubing to a respirator and a fit testing device; instruct the user to don the respirator; prompt the user to begin the respirator fit test; perform the respirator fit test upon receiving a positive response from the user; detect a signal from the respirator fit testing device; analyze data of the respirator fit test on the processor; troubleshoot at least one failure of the respirator fit test when a failing fit factor is detected; display to the user a subset of videos on a graphical user interface to correct the failure; and, perform the respirator fit test at least a second time.

Aspect 30: The computer program product of aspect 29, wherein the respirator fit test is controlled negative pressure.

Aspect 31: The computer program product of aspect 29, wherein the respirator fit test is condensation nuclei counting.

Aspect 32: The computer program product of any of the foregoing aspects, comprising instructions to resolve at least one failure, prompt the user to remove the respirator, at least one adapter, and at least one set of tubing, display a result on the graphical user interface, and display a QR code on the graphical user interface, wherein the QR code may notify the user of the result.

Aspect 33: A kit comprising a computer program product for performing a respirator fit test using a virtual operator, at least one adapter, at least one tubing, and at least one respirator.

Aspect 34: A computer-implemented and software-controlled method to perform a respirator fit test, the method comprising: instructing a user to select a respirator; instructing the user to connect at least one set of tubing to the respirator and a fit testing device; instructing the user to don the respirator; prompting the user to begin the respirator fit test; performing the respirator fit test upon receiving a positive response from the user, wherein the user is instructed to perform at least one exercise; detecting at a processor, a signal from the respirator fit testing device; collecting at least one data point from the signal; analyzing data of the respirator fit test on the processor, comprising calculating at least one fit factor for the at least one exercise, calculating an overall fit factor for the respirator fit test, and determining at least one overall failing fit factor or at least one overall passing fit factor of the respirator fit test; troubleshooting at least one failure of the respirator fit test when an overall failing fit factor is detected, comprising detecting the failure, determining a cause of the failure, and prompting the user to perform a specific task to troubleshoot the cause of the failure; displaying to the user a subset of videos on a graphical user interface to correct the failure; and, performing the respirator fit test at least a second time.

EXAMPLES

Example 1: CNC Respirator Fit Test

The methods and systems of the present disclosure were used for respirator fit testing with CNC. The methods and systems of the present disclosure assisted in performing the initial operations of the respirator fit test, including: selecting a medium size respirator from an onscreen menu, guiding the user on how to navigate the virtual operator screen, providing instructions for setting up the respirator for proper fit testing, and requesting user confirmation of the respirator set up.

Once the user confirmed the setup, the methods and systems of the present disclosure provided instructions for donning the respirator and requested user confirmation. After receiving user confirmation, the methods and systems of the present disclosure described the CNC testing process to the user and provided tips for a successful CNC test.

The methods and systems of the present disclosure began the CNC testing process by instructing the user to bend over and breathe normally for 50 seconds. Once the user bent over, the methods and systems of the present disclosure initiated a test measurement comprising a 20 second ambient sample and a 30 second respirator sample. The ambient particle count detected was 6000. At the end of the testing, the methods and systems of the present disclosure aborted the test after detecting 20 particles in the respirator sample, causing a failing fit factor of 300, which resulted in a failed step.

The methods and systems of the present disclosure advised the user to confirm the seal of the respirator on the face and offered a resolution such as proper respirator placements. The user was then instructed to repeat the test. The user was again instructed to bend over and breathe normally for 50 seconds. The methods and systems of the present disclosure initiated a test measurement comprising a 20 second ambient sample and a 30 second respirator sample.

The methods and systems of the present disclosure indicated a successful step and a passing individual fit factor. The methods and systems of the present disclosure then instructed the user to slowly turn his head from side to side and initiated a 30 second respirator sample. After collecting the 30 second respirator sample, the methods and systems of the present disclosure indicated a successful step and a passing individual fit factor.

The methods and systems of the present disclosure instructed the user to slowly move his head up and down and initiated a test measurement consisting of a 30 second respirator sample and a 9 second ambient sample. The methods and systems of the present disclosure indicated a successful step and a passing individual fit factor.

The methods and systems of the present disclosure informed the user that the fit test was successful. The passing overall fit factor was reported as 3800. The user was instructed how to remove the respirator and disconnect the respirator from the fit testing device.

Example 2: CNP Respirator Fit Test

The methods and systems of the present disclosure are set up for respirator fit testing with CNP. The methods and systems of the present disclosure assist in performing the initial operations of the respirator fit test, including: selecting a respirator size from an onscreen menu, guiding the user how to navigate the virtual operator screen, providing instructions for setting up the respirator for proper fit testing, and requesting user confirmation of the respirator set up.

Once the user confirmed the setup, the methods and systems of the present disclosure provide instructions for donning the respirator and would request user confirmation. After receiving user confirmation, the methods and systems of the present disclosure describe the CNP testing process to the user and provide tips for a successful CNP test.

Figure 3:
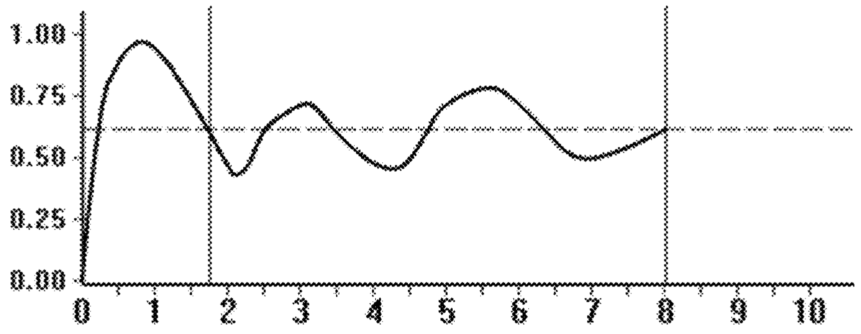
FIG. 3 includes a graph of inches of water over time (seconds) for CNP respirator fit testing using the methods and systems of the present disclosure, wherein the dotted line indicates an established challenge pressure.

The methods and systems of the present disclosure begin the CNP testing process by instructing the user to face forward, take a breath, and hold breath with mouth closed. The methods and systems of the present disclosure sense the breath hold and initiate a test measurement. Before completing the test measurement, the methods and systems of the present disclosure abort the test after sensing too much air movement within the respirator facepiece (FIG. 3), causing a failing individual fit factor. The methods and systems of the present disclosure collect the signal in the form of pressure data and generate a graph of inches of water over time (seconds) (FIG. 3). The methods and systems of the present disclosure analyze the graph during this exercise and determine the failure is due to air movement as a result of improper breath or movement.

The methods and systems of the present disclosure advise the user to remain still with the mouth closed during test measurements. The methods and systems of the present disclosure then instruct the user to retry the step.

Figure 4:
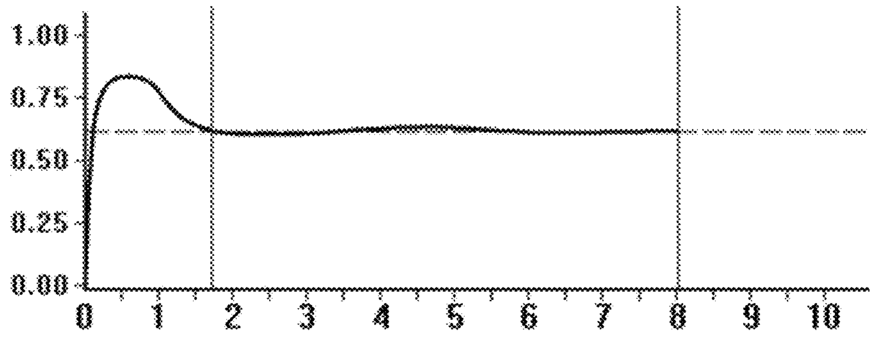
FIG. 4 includes a graph of inches of water over time (seconds) for CNP respirator fit testing using the methods and systems of the present disclosure, wherein the dotted line indicates an established challenge pressure.

The methods and systems of the present disclosure complete an 8 second test measurement and collect the signal in the form of pressure data and generate a graph of inches of water over time (seconds) (FIG. 4). The methods and systems of the present disclosure analyze the graph during this exercise and determine the failure is due to improper placement of the inhalation valve such as the valve is not propped, incorrectly place, incorrectly connected, or incorrectly removed. The methods and systems of the present disclosure advise the user to remove the adapter, insert the valve prop in the inhalation valve, and/or remove the inhalation valve and reconnect the adapter. The methods and systems of the present disclosure then instruct the user to retry the step.

Figure 5:
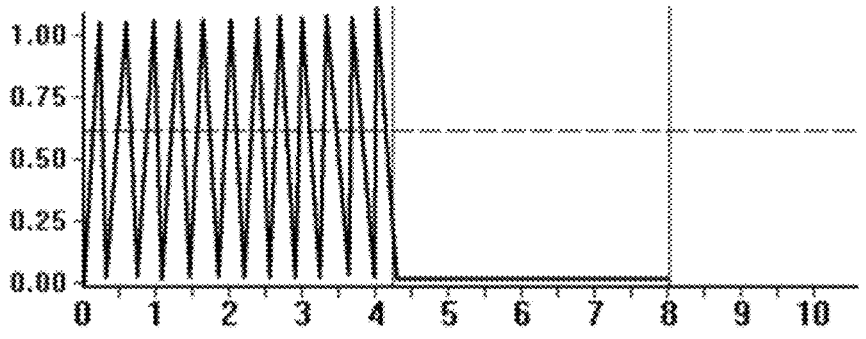
FIG. 5 includes a graph of inches of water over time (seconds) for CNP respirator fit testing using the methods and systems of the present disclosure, wherein the dotted line indicates an established challenge pressure.

The methods and systems of the present disclosure complete an 8 second test measurement and collect the signal in the form of pressure data and generate a graph of inches of water over time (seconds) (FIG. 5). The methods and systems of the present disclosure analyze the graph during this exercise and determine the failure is due to a leak in the respirator. The methods and systems of the present disclosure advise the user to adjust the respirator, press the respirator against the face, and/or ensure the straps are the correct length to correct the failure. The methods and systems of the present disclosure then instruct the user to retry the step.

The methods and systems of the present disclosure complete an 8 second test measurement and indicate an individual passing fit factor. The methods and systems of the present disclosure then instruct the user to hold his face in an upward position, take a breath, and hold the breath with a closed mouth. The methods and systems of the present disclosure sense the breath hold and initiate a test measurement for 8 seconds.

After indicating an individual passing fit factor, the methods and systems of the present disclosure instruct the user to hold his face in a downward position, take a breath, and hold the breath with a closed mouth. The methods and systems of the present disclosure sense the breath hold and initiate a test measurement for 8 seconds.

After indicating an individual passing fit factor, the methods and systems of the present disclosure instruct the user to bend over, look left, take a breath, and hold breath tight with a closed mouth. The methods and systems of the present disclosure sense the breath hold and initiate a test measurement for 8 seconds.

After indicating an individual passing fit factor, the methods and systems of the present disclosure instruct the user to bend over, look right, take a breath, and hold the breath with a closed mouth. The methods and systems of the present disclosure sense the breath hold and initiate a test measurement for 8 seconds.

After indicating an individual passing fit factor, the methods and systems of the present disclosure calculate an overall fit factor of 1782. The methods and systems of the present disclosure inform the user that the fit test was completed and successful. The methods and systems of the present disclosure instruct the user how to remove the respirator and disconnect it from the fit testing device. The methods and systems of the present disclosure then report the results to the user.

What is claimed is:

1. A computer-implemented and software-controlled method to perform a respirator fit test, the method comprising:
- instructing a user to select a respirator;
- instructing the user to connect at least one set of tubing to the respirator and a fit testing device;
- instructing the user to don the respirator;
- prompting the user to begin the respirator fit test;
- performing the respirator fit test upon receiving a positive response from the user, wherein the user is instructed to perform at least one exercise;
- detecting at a processor, a signal from the fit testing device;
- collecting at least one data point from the signal;
- analyzing the at least one data point of the respirator fit test on the processor, comprising calculating at least one individual fit factor for the at least one exercise, determining at least one failing individual fit factor, and calculating an overall fit factor for the respirator fit test, wherein the overall fit factor is one of an overall failing fit factor or an overall passing fit factor;
- troubleshooting in real time, without need for human intervention, at least one failure of the respirator fit test when the at least one failing individual fit factor is determined, comprising detecting the at least one failure, determining a cause of the at least one failure in real time, and prompting the user to perform a specific task to troubleshoot the cause of the at least one failure, wherein the troubleshooting is configured to detect failures both undetectable and detectable by a human during the analysis of the at least one data point;
- displaying to the user a subset of videos on a graphical user interface to correct the at least one failure; and,
- performing the respirator fit test at least a second time.

2. The method of claim 1, wherein the respirator fit test is controlled negative pressure or condensation nuclei counting.

3. The method of claim 1, wherein the signal generates particle count data.

4. The method of claim 1, wherein the signal generates pressure data.

5. A computer-implemented and software-controlled method to perform a respirator fit test, the method comprising:
- instructing a user to select a respirator;
- instructing the user to connect at least one set of tubing to the respirator and a fit testing device;
- instructing the user to don the respirator;
- prompting the user to begin the respirator fit test;
- performing the respirator fit test upon receiving a positive response from the user;
- detecting at a processor, a signal from the fit testing device;
- analyzing data of the respirator fit test on the processor;
- troubleshooting in real time, without need for human intervention, at least one failure of the respirator fit test when a failing individual fit factor is detected, wherein the troubleshooting is configured to detect failures both undetectable and detectable by a human during the analysis of the data of the respirator fit test;
- displaying to the user a subset of videos on a graphical user interface to correct the at least one failure; and,
- performing the respirator fit test at least a second time.

6. The method of claim 5, wherein the respirator fit test is controlled negative pressure or condensation nuclei counting.

7. The method of claim 5, wherein the signal generates particle count data.

8. The method of claim 5, wherein the signal generates pressure data.

9. The method of claim 5, wherein performing the respirator fit test upon receiving a positive response from the user comprises instructing the user to perform at least one exercise.

10. The method of claim 5, wherein analyzing data of the respirator fit test on the processor comprises:
- calculating at least one individual fit factor for at least one exercise; and
- calculating an overall fit factor for the respirator fit test, wherein the overall fit factor is one of an overall failing fit factor or an overall passing fit factor.

11. The method of claim 5, wherein analyzing the data of the respirator fit test on the processor comprises:
- collecting at least one data point from the signal.

12. The method of claim 5, wherein analyzing the data of the respirator fit test on the processor comprises:
- generating a graph of at least two data points collected from the signal.

13. The method of claim 11, wherein the at least one data point is collected each second for eight seconds.

14. The method of claim 5, wherein troubleshooting the at least one failure of the respirator fit test comprises:
- detecting the at least one failure;
- determining a cause of the at least one failure; and
- prompting the user to perform a specific task to troubleshoot the cause of the at least one failure.

15. The method of claim 5, wherein troubleshooting the at least one failure of the respirator fit test comprises:
- prompting the user to remove the respirator, and
- prompting the user to select a different respirator size.

16. The method of claim 5 comprising,
- resolving the at least one failure;
- prompting the user to remove the respirator, at least one adapter, and the at least one set of tubing;
- displaying a result on the graphical user interface; and,
- displaying a QR code on the graphical user interface, wherein the QR code may notify the user of the result.

17. The method of claim 16, wherein the notifying is a text message or an electronic mail.

18. A system for performing a respirator fit test, the system comprising:

a processor; and a memory storing computer-readable instructions that, when executed by the processor, cause the processor to trigger execution of a virtual operator respirator fit test, wherein the virtual operator respirator fit test comprises program instructions to:

instruct a user to select a respirator;

instruct the user to connect at least one tubing to the respirator and a fit testing device;

instruct the user to don the respirator;

prompt the user to begin the respirator fit test;

perform the respirator fit test upon receiving a positive response from the user;

detect a signal from the fit testing device;

analyze data of the respirator fit test on the processor;

troubleshoot in real time, without need for human intervention, at least one failure of the respirator fit test when a failing individual fit factor is detected, wherein the troubleshooting is configured to detect failures both undetectable and detectable by a human during the analysis of the data of the respirator fit test;

display to the user a subset of videos on a graphical user interface to correct the at least one failure; and, perform the respirator fit test at least a second time.

19. The system of claim 18, wherein the respirator fit test is controlled negative pressure or condensation nuclei counting.

20. The system of claim 18, comprising program instructions to:

resolve the at least one failure;

prompt the user to remove the respirator, at least one adapter, and the at least one tubing;

display a result on the graphical user interface; and, display a QR code on the graphical user interface, wherein the QR code may notify the user of the result.

21. The system of claim 18, wherein analyzing data of the respirator fit test on the processor comprises:

calculating at least one individual fit factor for at least one exercise; and calculating an overall fit factor for the respirator fit test, wherein the overall fit factor is one of an overall failing fit factor or an overall passing fit factor.

22. The system of claim 18, wherein program instructions to analyze the data of the respirator fit test on the processor comprises program instructions to:

collect at least one data point from the signal.

23. The system of claim 18, wherein program instructions to analyze the data of the respirator fit test on the processor comprises program instructions to:

generate a graph of at least two data points from the signal.

24. The system of claim 18, wherein troubleshooting the at least one failure of the respirator fit test comprises:

prompting the user to remove the respirator, and prompting the user to select a different respirator size.

25. A computer program product for performing a respirator fit test using a virtual operator, comprising at least one non-transitory computer readable medium including program instruction that, when executed by at least one processor, cause the at least one processor to:

instruct a user to select a respirator;

instruct the user to connect at least one set of tubing to the respirator and a fit testing device;

instruct the user to don the respirator;

prompt the user to begin the respirator fit test;

perform the respirator fit test upon receiving a positive response from the user;

detect a signal from the fit testing device;

analyze data of the respirator fit test on the at least one processor;

troubleshoot in real time, without need for human intervention, at least one failure of the respirator fit test when a failing individual fit factor is detected, wherein the troubleshooting is configured to detect failures both undetectable and detectable by a human during the analysis of the data of the respirator fit test;

display to the user a subset of videos on a graphical user interface to correct the at least one failure; and, perform the respirator fit test at least a second time.

26. The computer program product of claim 25, comprising program instructions to:

resolve the at least one failure;

prompt the user to remove the respirator, at least one adapter, and the at least one set of tubing;

display a result on the graphical user interface; and display a QR code on the graphical user interface, wherein the QR code may notify the user of the result.

* * * * *